March 25, 1930. E. O. ENGELS 1,752,158
OVEN
Filed Oct. 13, 1928
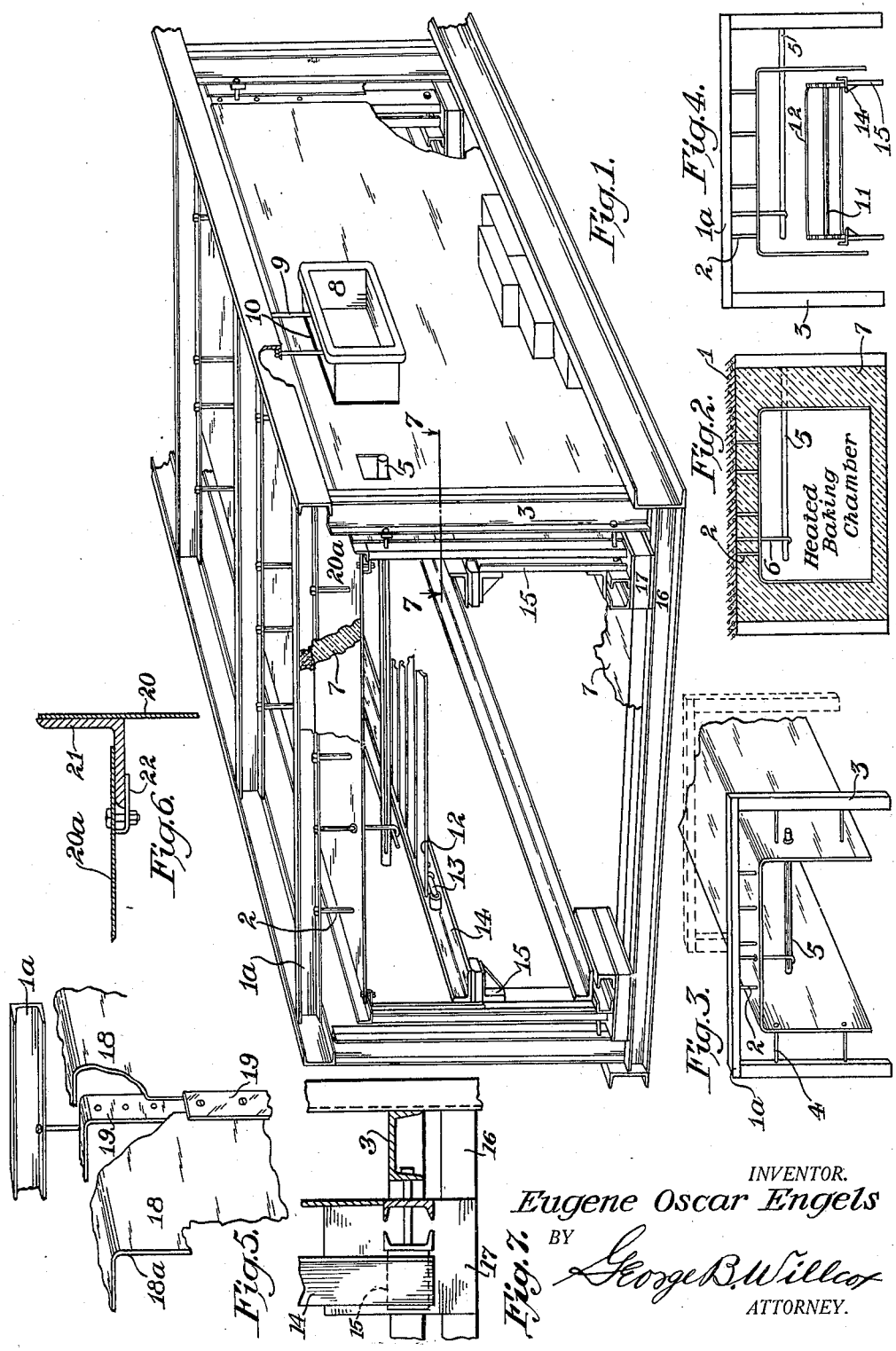
INVENTOR.
Eugene Oscar Engels
BY
George B. Willcox
ATTORNEY.

Patented Mar. 25, 1930

1,752,158

UNITED STATES PATENT OFFICE

EUGENE OSCAR ENGELS, OF SAGINAW, MICHIGAN, ASSIGNOR TO BAKER PERKINS COMPANY, INC., OF SAGINAW, MICHIGAN, A CORPORATION OF NEW YORK

OVEN

Application filed October 13, 1928. Serial No. 312,290.

This invention is an improvement in bake ovens of the so-called tunnel or box type consisting of a heated baking chamber surrounded by an enveloping layer of heat insulating material, all enclosed in an outer box or tunnel-like shell which is supported by a suitable framework.

The invention is especially advantageous when incorporated in an oven of the elongated tunnel type, wherein the baking chamber may in practice approximate six to twelve feet wide, five feet high and from forty to one hundred twenty feet long.

It is also of advantage when applied to peel ovens, plate ovens, traveling tray ovens and similar structures of shorter or box-like shape.

The objects attained by ovens constructed according to my invention are great heat flexibility, being the property of changing rapidly from one kind of baking to another; and low heat absorption capacity in the baking chamber structure, due to its lightness, which imparts an ability to heat or cool the baking chamber rapidly at the beginning or end of a run. This invention enables a large oven to be heated to baking temperature in, say, thirty minutes, whereas prior constructions have required two hours on account of their greater heat absorption.

Another object of my invention is to provide a bake oven of the box type or the elongated tunnel type with an inner baking chamber that is steam-tight, yet possesses side walls and roof or crown so relatively thin and light as to adapt themselves to variations of heat expansion without developing any thrusts, strains or forces of a character that can be transmitted either to the conveyors, baffles, burners or other apparatus inside the baking chamber or to the outside walls or supporting framework of the oven proper. In other words, the invention provides a baking chamber that can be quickly put through its wide range of baking temperatures from atmospheric temperature to baking heat without in any way crowding, straining or otherwise affecting either the internal mechanical equipment or the external walls and their attendant fittings such as inspection door housings, burner boxes etc. Hence the baking chamber of this invention may be described as being expansionally indifferent to and structurally independent of the conveyor tracks and their supports within the baking chamber and also of the tiled, glass-faced, metal-glazed or otherwise finished structures that constitute the outer shell or frame-work of the oven.

The invention provides for the thin walled baking chamber a novel mode of supporting it in floating or semi-floating condition.

Prior oven structures have usually possessed baking chambers of relatively massive structure such as masonry or steel plate walls on heavy steel frames, the object having been to make the baking chamber heavy and strong enough to be self-supporting and also capable of carrying the tray conveyors and their loads of material to be baked, in addition to the burners, baffles and other necessary internal equipment. In some prior structures even the exterior walls of the oven proper have been fixed to and supported by the inner baking chamber structure. In such cases rollers and similar devices have been employed as supports for the oven in the endeavor to mitigate the troubles that arise from the enormous expansion thrusts and bodily displacements imparted to the baking chamber when being heated to baking temperature.

The well-known disastrous results of such rigid constructions when incorporated in a baking chamber are cracked outer walls and air leaks, especially when the outer walls are made of glass, tile or other brittle material.

My improved mode of supporting the baking chamber so as to avoid the above mentioned difficulties is to suspend its weight, or a substantial portion of its weight, from a chamber-supporting element. This element may be a part of the building in which the oven is located, or it may be a crown beam supported on columns and located above the baking chamber, preferably spaced apart from it and heat insulated. The baking chamber, although of light sheet material such as twelve-gauge steel sheets of such large area as to be normally incapable of holding up their own weight when stood on edge, is by this means sustained in its correct tunnel or box-like form. Since all or a large portion of its weight is freely suspended, and since its walls are thin and flexible, it is obvious that the bad effects of heat expansion above enumerated are entirely avoided, and the baking chamber can function through all its temperature ranges without at all affecting either the alinement of the conveyor tracks, or the outside shell of the oven.

With the foregoing and certain other objects in view, which will appear later in the specification, my invention comprises the devices described and claimed and the equivalents thereof.

In the drawings Fig. 1 is a three-quarter front view in perspective, partly broken away, showing the improved oven structure.

Fig. 2 is a diagrammatic end view, with the conveyor and certain of the bracing omitted.

Fig. 3 is a diagrammatic perspective view, showing the arrangement of the outer supporting framework as applied to a tunnel-type oven or to a box oven.

Fig. 4 is a front diagrammatic view showing the manner of supporting the conveyor independent of the walls of the baking chamber.

Fig. 5 is a perspective detail, partly broken away, showing a modified mode of constructing and connecting the side wall panels and crown sheets of the baking chamber.

Fig. 6 is a detail in cross section of a modified joint structure between the top edge of a side wall of the baking chamber and the crown sheet.

Fig. 7 is a detail in cross-section taken on the line 7—7 of Fig. 1.

As is clearly shown in the drawings, the oven structure includes a heated baking chamber of any suitable size and capacity, made of sheet material, preferably light such as twelve-guage sheet steel, fabricated to provide an elongated tunnel or a box, in any length suitable for the baking operations desired to be performed.

Above the baking chamber and spaced therefrom is a suitable supporting element 1, which may be the ceiling or other part of a building in which the oven is located, or it may be a crown beam, 1ª. This beam or supporting element carries suspension members 2, preferably rods that are secured to the crown sheets and are adapted to sustain the baking chamber in its proper tunnel or box-like shape and in spaced relation to the supporting element 1. The members 2 carry the greater part or all of the weight of the baking chamber, holding it up in substantially floating relation to the rest of the oven. The walls and the crown sheet are thus left perfectly free to expand or to take any suitable position imposed upon them when subjected to oven heat, yet are incapable of transmitting undesirable thrusts or harmful strains to any other part of the oven structure, which might result in air leaks or cracked exterior finish.

When the crown beam 1ª is supported on columns 3 they together constitute bents exterior to the baking chamber, disposed lengthwise thereof and spaced outwardly therefrom, as shown in Fig. 3.

The side walls of the baking chamber and the columns 3 can be connected together by tie members 4 whose purpose is to constrain the side walls to their spaced relation with respect to the columns 3 without in any way interfering with the expansional independence of the thin walls of the baking chamber. The tie members 4, in other words, are merely spacers and are not depended upon for holding up the walls of the baking chamber or for sustaining its weight.

Within the baking chamber are the usual heating devices, such as burners 5. These burners may be supported by means of hangers 6 that are attached to the overhead supporting element 1 or crown beam 1ª. The hangers 6 are preferably heat insulated to minimize heat conduction from the interior of the baking chamber to the crown beam.

Around the baking chamber is an enveloping structure 7 of heat-insulating material. It may be made to cover the top or crown and fill the bottom or substructure as well as covering the sides, as shown in Fig. 2.

Ovens of this type are usually supplied with inspection doors mounted on metal frames or housings, and in the form of this invention chosen for illustration the inspection door housings 8 are preferably supported by the outer framework or bents.

In practice I prefer to suspend the housings 8 from the crown beams 1ª or other overhead structure by means of suspension members 9 in such manner that the inner end of the housing is in register with an appropriate opening formed in the wall of the baking chamber, as shown in Fig. 1. Thus the weight of the housings is not imposed upon the thin walls of the baking chamber, but is supported from the outer framework in such manner that any distortion of the baking chamber due to heat expansion can not twist or strain the door housing and consequently injure the exterior glazed or tiled surface of the outer oven wall. The door housing is preferably heat-insulated, as at 10, from the wall of the baking chamber to minimize loss of heat by conductivity through the housing.

Having explained the expansional and structural independence of the baking chamber walls and crown with respect to the rest of the oven structure, I will now explain their similar independence with respect to the oven mechanism. Such ovens are usually equipped as previously stated, with suitable mechanism capable of transporting material through the baking zone, such as conveyors of the traveling tray or traveling plate types.

In Fig. 4 is indicated diagrammatically such a conveyor 11 whose flights or trays 12 are carried on chains 13 that slide or roll on tracks 14 extending lengthwise the baking chamber in the usual manner. The tracks 14 are carried on supports 15 which for the purpose of my invention are structurally independent of the walls of the baking chamber in order that any distortion of the baking chamber walls shall have no effect whatever upon the alignment or operation of the conveyors. Likewise the tracks 14 and the conveyor 11 have their own moments of expansion entirely independent of the walls of the baking chamber.

The tracks 14 preferably lie loosely upon the supports 15 and are, therefore, expansionally independent of those supports. Hence there is no likelihood of binding the conveyor mechanism on account of warping of the tracks 14 and there is no possibility of binding occurring in any part of the conveyor mechanism by reason of expansion or warping of the baking chamber walls.

To prevent conduction of heat from inside the baking chamber down through the track supports 15 to the substructure 16 I preferably mount the supports 15 on blocks of insulating material 17.

In operation the material to be baked is introduced into the oven and transported through it by the conveying mechanism in the usual manner. The baking chamber may be heated by gas or electric burners 5 or other heating means, as is usual in baking ovens of this type. The temperature within the baking chamber can be altered and the amount of baking heat increased or decreased very rapidly and with great ease and flexibility of operation. The quantity of heat absorbed by the walls of the baking chamber is comparatively slight because the heat capacity is proportionally small. The oven heat responds very quickly to changes in burner control. No matter what degree of heat is applied, nor how suddenly or how often it is changed, the resultant expansion and warping effect in the walls of the baking chamber can not be transmitted to any other parts of the oven. Consequently it now becomes entirely practicable to face the outer walls of the oven with glass or highly glazed and finished material of a brittle nature, without risk of damaging them by expansion cracks induced by any heat strains that can possibly be set up in the baking chamber structure.

The structural details of the combustion chamber are matters of minor importance as compared with the broader aspects of the invention, but they embody certain novel constructions which facilitate assembling, erection and shipping and, therefore, are claimed herein.

Referring to Fig. 5, 18 designates sheets that together constitute the side wall and crown or roof of the baking chamber, the sheets in this instance extending across the crown and down both sides, being bent at the upper corner 18$^a$. For convenience in shipping the sheets are preferably about ten feet long, so that a long oven can be built up of numerous short sections. A convenient way of securing the side panel sheets together during erection is by a pair of butt straps 19 bolted together and receiving between them rather loosely the edges of the sheets 18, as shown in Fig. 5. The butt straps may be suspended from the crown beam 1$^a$, or they may rest on the substructure.

Instead of bending the plates as at 18$^a$ the side sheets 20 and the crown sheets 20$^a$ may be joined as shown in Fig. 6, where 21 is a horizontal stiffening member, preferably an angle iron, welded along the upper edge of the side sheet 20, the horizontal flange of the angle supporting the longitudinal edge of the crown sheet 20 and being slightly clamped to it by means of a bolted clip 22. Referring to the structure shown in Figs. 5 and 6 it will be noted that in neither arrangement is the fundamental characteristic of the baking chamber walls affected, for these constructions do not materially increase the mass of the baking chamber nor its heat capacity, although they do enable the chamber to be built up of relatively small sheets in the form of baking chamber sections that are capable of being conveniently shipped and assembled.

Having thus described my invention, what I claim and desire to secure by Letters Patent is:

1. A bake oven structure including a heated baking chamber, a conveyor therein, a substructure and a framework thereon exterior to said chamber and spaced therefrom, suspension members hung from said framework and sustaining said chamber in form of an inverted U-shaped tunnel, and conveyor supports within said chamber and mounted on the substructure but structurally independent of the walls thereof, for the purposes set forth.

2. A bake oven structure including a heated baking chamber, a conveyor therein, a framework exterior to said chamber and spaced therefrom, suspension members hung from said framework and sustaining said chamber in form of a tunnel, and conveyor supporting members within said chamber and structurally independent of the walls thereof, said members heat-insulated to prevent loss of oven heat by conductivity through them to places outside the baking chamber.

3. A bake oven structure including a framework comprising a crown beam and supporting columns, a baking chamber within said framework and spaced therefrom, the walls of said chamber of thin sheet material, suspension members carried by said crown beam and adapted to sustain said chamber in the form of a tunnel, and lateral tie members secured to said framework and to the side walls of said chamber, an inspection door housing suspended from said crown beam in register with an opening formed in a wall of the chamber, heating elements within said chamber and suspended from said crown beam by means of hangers passing through openings in the top of said chamber, a conveyor in said chamber and conveyor supports therein, said supports being expansionally independent to the walls of the chamber, said conveyor supports and inspection door housing being heat-insulated from the walls of the baking chamber to retard conductivity therefrom, and heat-insulating material forming an enveloping layer around said baking chamber, for the purposes set forth.

4. In an oven of the class described, a baking chamber formed of a crown or roof comprising a plurality of panel sections assembled edge to edge, expansion joints uniting the adjacent edges of successive sections, suspension rods sustaining said crown sections, and side wall members of sheet metal secured to the longitudinal edges of said crown sections, in substantially suspended relation thereto, for the purposes set forth.

5. A heated baking chamber comprising a plurality of separate sections each consisting of a crown and two side walls, said sections arranged end-to-end in tunnel form, suspension members sustaining each oven section independently of the other, and expansible joints connecting the contiguous edges of adjacent sections, for the purposes set forth.

In testimony whereof, I affix my signature.

EUGENE OSCAR ENGELS.